United States Patent [19]

Tsubaki et al.

[11] Patent Number: 5,995,470
[45] Date of Patent: Nov. 30, 1999

[54] METHOD OF RECORDING AND REPRODUCING INFORMATION SIGNALS AND APPARATUS FOR EDITING THE SAME

[75] Inventors: Masami Tsubaki; Kaoru Sekigawa, both of Kanagawa, Japan

[73] Assignee: Sony Corporation, Tokyo, Japan

[21] Appl. No.: 08/838,314

[22] Filed: Apr. 8, 1997

[30] Foreign Application Priority Data

Apr. 11, 1996 [JP] Japan .................................. 8-089815

[51] Int. Cl.⁶ ..................................................... G11B 7/00
[52] U.S. Cl. ................................ 369/83; 369/59; 369/48
[58] Field of Search .................................. 369/48, 47, 59, 369/58, 54, 83, 84

[56] References Cited

U.S. PATENT DOCUMENTS

| | | | |
|---|---|---|---|
| 5,224,087 | 6/1993 | Maeda et al. ............................. | 369/54 |
| 5,343,455 | 8/1994 | Takeuchi et al. ......................... | 369/59 |
| 5,363,362 | 11/1994 | Maeda et al. ............................ | 369/59 |
| 5,377,167 | 12/1994 | Maeda et al. ............................ | 369/58 |
| 5,485,448 | 1/1996 | Kishi et al. .............................. | 369/54 |
| 5,563,866 | 10/1996 | Taguchi et al. .......................... | 369/83 |
| 5,563,867 | 10/1996 | Gregg ..................................... | 369/83 |
| 5,684,770 | 11/1997 | Kim ....................................... | 369/83 |
| 5,703,867 | 12/1997 | Miyaauchi et al. .................. | 369/275.2 |
| 5,737,639 | 4/1998 | Ohmori ................................ | 369/275.3 |
| 5,761,173 | 11/1996 | Inoue ...................................... | 369/83 |

*Primary Examiner*—Muhammad Edun
*Attorney, Agent, or Firm*—Frommer Lawrence & Haug, LLP.; William S. Frommer

[57] ABSTRACT

An apparatus for editing an input information signal is capable of preventing breaks in sound even if the length of a cut is edited as extremely short. In the editing apparatus, the input digital information signal is temporarily stored in a recording buffer means. Further, the digital information signal is read at a speed faster than its write speed and recorded on a recording medium. The digital information signal read from the recording medium is written into a reproducing buffer means. Thereafter, the digital information signal is read from the reproducing buffer means at a speed slower than its write speed, after which it is restored to an analog information signal. A control means for controlling recording and reproduction controls whether an information signal should be recorded in an auxiliary area according to the presence or absence of a splice recording, and monitors whether a point to be edited has been changed to a length causing a break in sound due to editing. Thus, even if the length of a redefined cut is less than or equal to a limit length, edit working allows the prevention of the length of the cut being less than or equal to the limit length. It is thus possible to reliably prevent the occurrence of breaks in reproduced sound.

7 Claims, 8 Drawing Sheets

FIG. 1
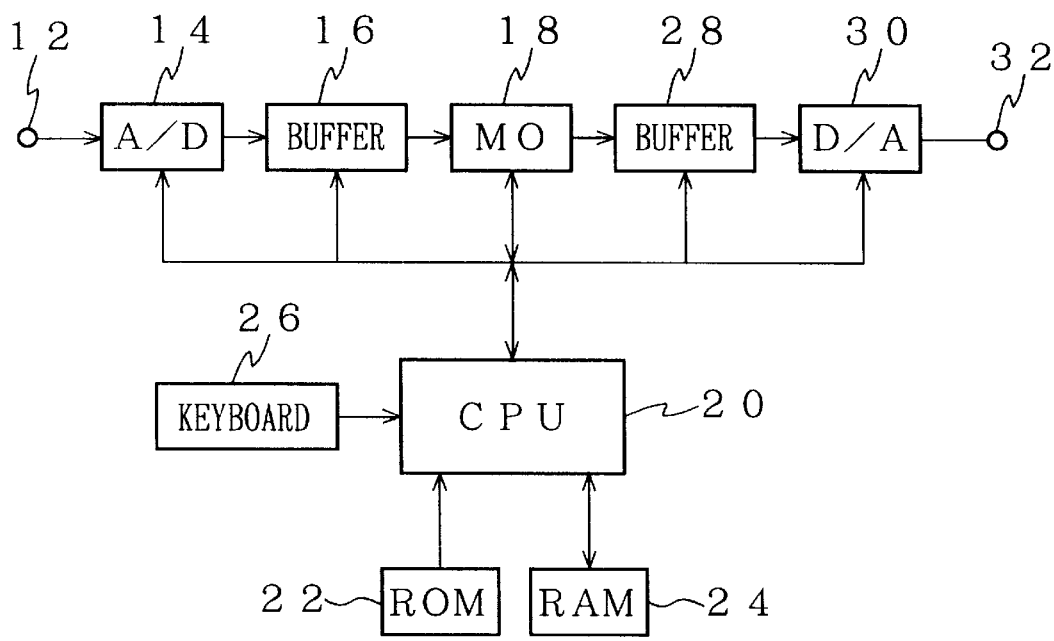
FIG. 2A  PHYSICAL POSITION OF MEDIUM
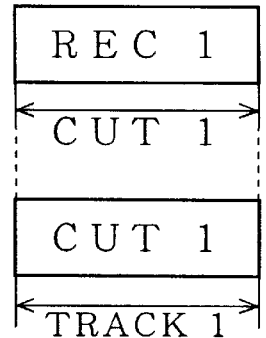
FIG. 2B  TIME SEQUENCE OF REPRODUCED SIGNAL
FIG. 2C
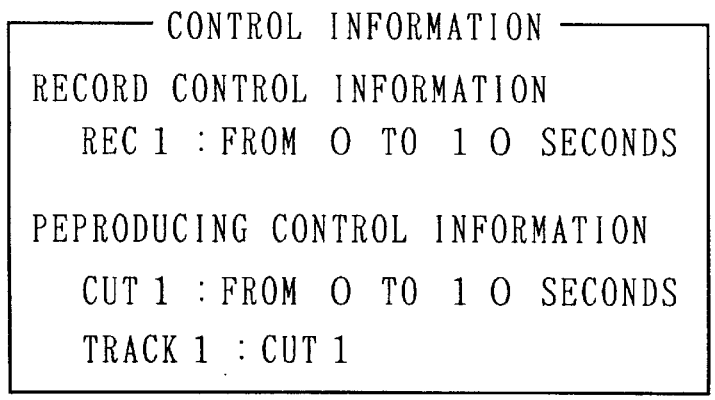

FIG. 3A PHYSICAL POSITION OF MEDIUM

FIG. 3B TIME SEQUENCE OF REPRODUCED SIGNAL

FIG. 3C TIME SEQUENCE OF REPRODUCED SIGNAL

```
────── CONTROL INFORMATION ──────
RECORD CONTROL INFORMATION
    REC 1 : FROM    0 TO 1 0 SECONDS
    REC 2 : FROM  1 1 TO 2 1 SECONDS

REPRODUCING CONTROL INFORMATION
    CUT 1 : FROM    0 TO 1 0 SECONDS
    CUT 2 : FROM  1 1 TO 2 1 SECONDS
```

FIG. 4A PHYSICAL POSITION OF MEDIUM
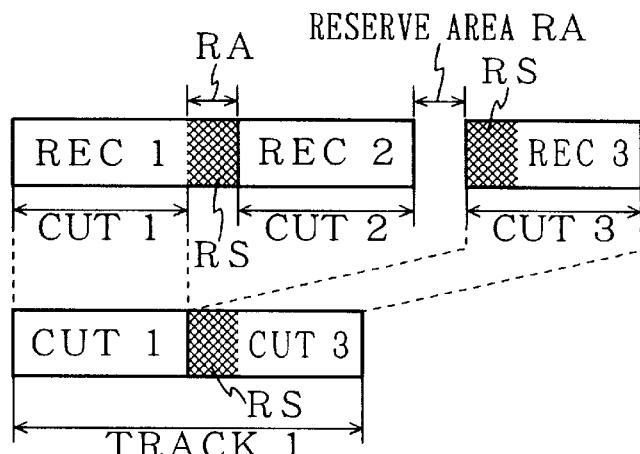
FIG. 4B TIME SEQUENCE OF REPRODUCED SIGNAL
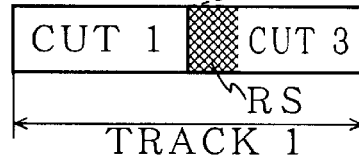
FIG. 4C TIME SEQUENCE OF REPRODUCED SIGNAL
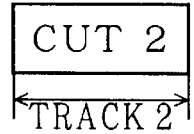
FIG. 4D
```
— CONTROL INFORMATION —
RECORD CONTROL INFORMATION
    REC 1 : FROM   0 TO 1 0 SECONDS
    REC 2 : FROM  1 1 TO 2 1 SECONDS
    REC 3 : FROM  2 2 TO 3 2 SECONDS
REPRODUCING CONTROL INFORMATION
    CUT 1 : FROM   0 TO 1 0 SECONDS
    CUT 2 : FROM  1 1 TO 2 1 SECONDS
    CUT 3 : FROM  2 2 TO 3 2 SECONDS
    TRACK 1 : CUT 1, CUT 3
    TRACK 2 : CUT 2
```

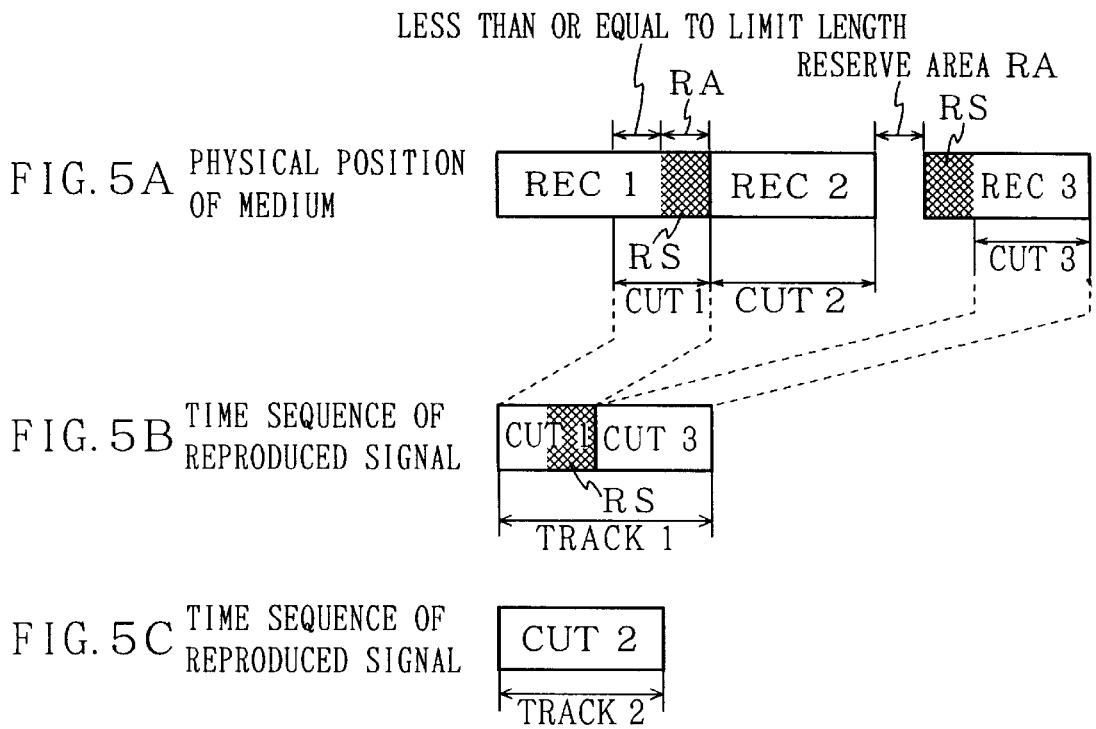

FIG. 8A PHYSICAL POSITION OF MEDIUM 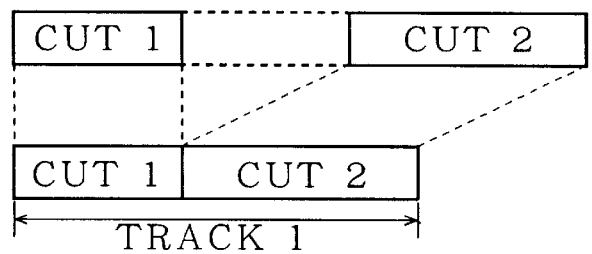
FIG. 8B TIME SEQUENCE OF RECORDED SIGNAL 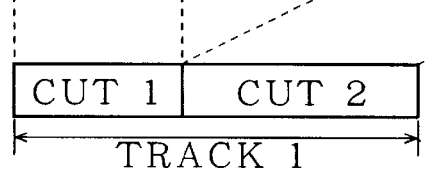
FIG. 9A PHYSICAL POSITION OF MEDIUM 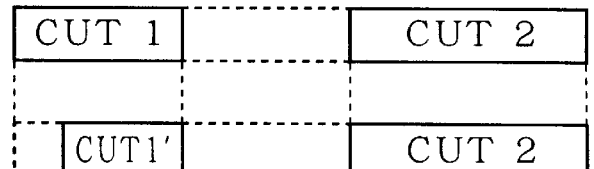
FIG. 9B CUT REDEFINED BY EDITING
FIG. 9C AFTER-EDITED TRACK 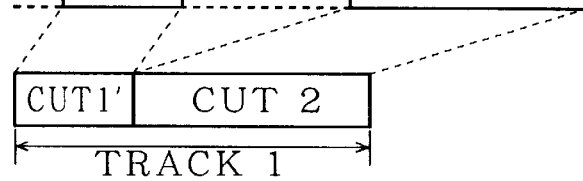

FIG. 10A PHYSICAL POSITION OF MEDIUM
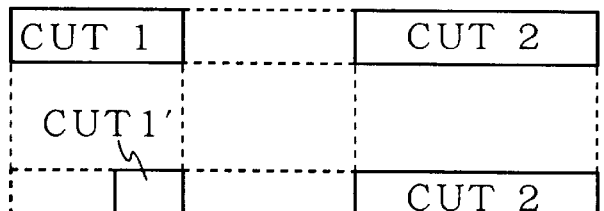
FIG. 10B CUT REDEFINED BY EDITING
FIG. 10C AFTER-EDITED TRACK
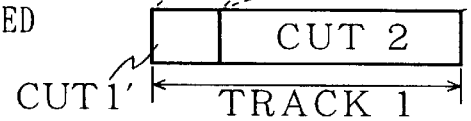
FIG. 11A WRITTEN TO BUFFER
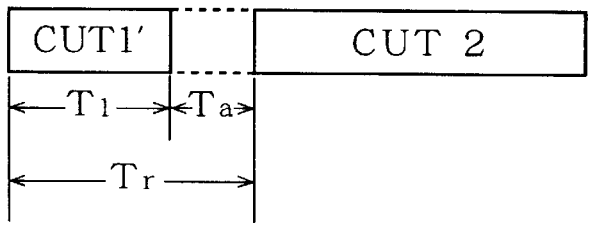
FIG. 11B READ FROM BUFFER
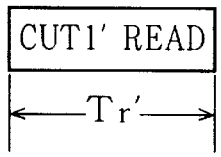

METHOD OF RECORDING AND REPRODUCING INFORMATION SIGNALS AND APPARATUS FOR EDITING THE SAME

BACKGROUND OF THE INVENTION

This invention relates to a method of recording and reproducing information signals such as audio signals and an apparatus for editing the information signals, both of which are suitable for use in editing of the information signals. Specifically, the present invention relates to an editing apparatus wherein when an information signal to be recorded by splicing is recorded in discontinuous recording areas, a portion of the head of the next information signal is recorded in superimposed form within an auxiliary area subsequent to each recording area in advance, whereby even when a start point to be edited is changed to a length causing a break in sound due to edit working, the information signal can be continuously reproduced without the break in sound.

If a random accessible recording medium such as a hard disk, a magneto optical disk or the like is used as a recording medium when an information signal such as an audio signal is edited by a recording and reproducing apparatus, the information signal can be recorded and reproduced even if the time sequence for recording and reproduction does not necessarily coincide with a physical position within the recording medium.

FIGS. 8A and 8B show the case in which a digital audio signal (TRACK1) regarded as having been recorded in succession as seen from the user side is represented as data (CUT1 and CUT2) recorded at two different positions on a recording medium.

When the user makes a splicing record (recording) of data as CUT2 within a separated non-used area on a disk subsequently to the signal at the end of CUT1 where after CUT1 on the TRACK1 has been recorded in the course of the recording of the TRACK1 as shown in FIG. 8A, a recording area located behind the CUT1 is an area already used as another track, such a state referred to above is produced.

Since a recording buffer means (buffer memory) is used even if it is necessary to continuously record an input signal at another physical position in the course of its recording, the input signal can be prevented from its recording leakage. This is because since the input signal is stored in the buffer means while the user is intended to access the leading position of the CUT2 after the writing of the input signal has been made up to the end of the CUT1, the input signal can be written onto the recording medium at high speed after the completion of its access.

Meanwhile, there are some cases in which when a cut point (CUT) is redefined and edit working is performed in this condition, the length of the redefined cut becomes extremely short. No problem arises when the length of a redefined cut (CUT1') is enough as shown in FIGS. 9A and 9B by way of example. This is because even when a track reconstructed as shown in FIG. 9C is reproduced, a head finishes accessing to CUT2 from CUT1' before the reading of final data by a reproducing buffer means when the CUT1' is written into the reproducing buffer means (buffer memory) at high speed and read therefrom at the normal speed, and hence reproduced data is in no danger of breaking before the completion of the head's access.

However, when the head reads CUT1' at high speed as shown in FIG. 11A and the read CUT1' is stored in the reproducing buffer means (the time that elapsed till then, is defined as T1) and thereafter the total time Tr that elapsed before CUT2 is accessed by a track jump or the like, becomes longer than a time Tr' required to read data stored in the buffer means as shown in FIG. 11B at the normal speed, where the redefined CUT is extremely short as shown in FIGS. 10A and 10B and an edited TRACK1 (see FIG. 10C) is obtained by reproduction, reproduced data will break.

Particularly since an extremely-short syllable has been often edited as a unit in recent years, the probability that a break in sound will be produced, increases correspondingly. Such a sound break should not be allowed positively upon professional editing. If the length of a cut to be redefined is limited, no break in sound will occur. However, since an excessive restriction is imposed on an editor if done so, the restriction of the length of the cut is hard to be quite an advisable solving means.

SUMMARY OF THE INVENTION

With the foregoing problems in view, it is therefore an object of the present invention to previously prevent the occurrence of a break in sound by automatically redefining the length of a cut to a length of more than a limit length allowing reproduction without the break in sound by editing even if a cut having a length less than the limit length is produced.

According to a first invention, for achieving the above object, there is provided a method of recording a plurality of Cuts of data on a random accessible recording medium, comprising the following steps:

a step of determining whether the Cut of data already recorded on the recording medium are spliced with input data to be recorded as a part of one track so that the input data is reproduced subsequently to the Cut of data already recorded on the recording medium;

a step of recording, upon recording the input data by splicing, a leading portion of the input data to be recorded subsequently to the end of a recording position of the Cut of data to be recorded by splicing, which has already been recorded on the recording medium; and a step of recording the input data on a non-recorded portion of the recording medium from the start.

According to a second invention, for achieving the above object, there is provided a method of editing Cuts of data recorded on a random accessible recording medium, wherein a part of a leading portion of Cut of data to be next reproduced is recorded in superimposed form by a predetermined length in auxiliary areas following the respective ends of Cuts of data, which are recorded at intervals away from one another with other Cut of data interposed therebetween on the recording medium and are to be reproduced in succession upon their reproduction, comprising the following steps:

a step of changing data indicative of a start point of each edited Cut of data, of data indicative of start and end points of the Cut of data accessed upon reproduction of the Cuts of data, according to the editing; and a step of changing data indicative of an end point of the edited Cut of data so as to indicate an end position of the auxiliary area when the editing is performed so that any of the Cut of data is partly deleted from its leading portion.

According to a third invention, for achieving the above object, there is provided an editing apparatus comprising:

first buffer means for storing input data therein;

means for recording the input data read from the first buffer means on a recording medium at a speed faster than a speed for storing the input data in the first buffer means and reproducing data from the recording medium;

second buffer means for storing the data reproduced from the recording medium therein and outputting the stored reproduced data at a speed slower than the storing speed; and means for controlling the first and second buffer means and the recording and reproducing means, the control means controlling the first buffer means and the recording and reproducing means so that when the data already recorded on the recording medium is spliced with the data outputted from the first buffer means to be recorded as a part of one track to be reproduced subsequently to the data already recorded on the recording medium, a leading portion of the data outputted from the first buffer means to be recorded subsequently to the end of a recording position of the data to be recorded by splicing, which has already been recorded on the recording medium, is recorded and the data outputted from the first buffer means is recorded on a non-recorded portion of the recording medium from the beginning.

According to a fourth invention, for achieving the above object, there is provided a method of recording information signals, comprising the following steps of:

providing auxiliary areas behind recording areas with the information signals already recorded and successively recording next-incoming information signals;

accessing only a recording area specified by an editing list to read the information signals such as audio signals or the like upon reproducing;

providing an auxiliary area behind the final record information recorded on a medium upon defining a spacing and recording an information signal by splicing, and recording the information signal to be recorded by splicing; and recording a portion of the head of the information signal to be recorded by splicing so as to be superimposed on an auxiliary area following the already-recorded final recording area to be recorded by splicing.

According to a fifth invention, for achieving the above object, there is provided a method of reproducing information signals such as audio signals or the like, wherein when upon change of a start point of a recording unit according to an editing process, a recording length of the changed recording unit is a length less than or equal to a limit length allowing reproduction without a break in sound, a new recording length including a leading portion of the next information signal already recorded in an auxiliary area located behind a recording area is used as a changed information-signal recording unit.

According to a sixth invention, for achieving the above object, there is provided an apparatus for editing input information signals, including:

recording buffer means for temporarily storing the input information signals therein;

a recording medium for recording the information signals read at a speed faster than their write speed;

reproducing buffer means for writing therein the information signals read from the recording medium and reading them therefrom at a speed slower than their write speed; and control means for controlling recording and reproduction, the control means controlling whether the information signals are to be recorded in an auxiliary area according to the presence or absence of recording by splicing, and monitoring whether a change of an edit point has occurred up to a length causing a break in sound due to editing.

In the present invention, the information signal to be recorded by splicing cannot be recorded in the continuous recording area upon recording by splicing. Upon discontinuous recording, the information signal to be recorded by splicing is recorded behind the final area for recording the information signal. Further, the leading portion of the information signal to be recorded by splicing is recorded in superimposed form within the auxiliary area provided behind the recording area subsequently to the already-recorded information signal for splice recording.

When the length of the cut redefined according to the editing is less than or equal to a given length, it is redefined as a new cut inclusive of the information signal recorded in the auxiliary area. The length of the redefined cut is set as a length free of a break in sound. Thus, even if the cut is set extremely short, no break in sound occurs so long as the cut redefined using the information signal recorded in the auxiliary area is used. The definition of the new cut is automatically given inside the apparatus without being given by an editor.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a fragmentary systematic diagram showing one embodiment of an information signal editing apparatus according to the present invention;

FIG. 2 is a diagram (No. 1) for describing an edit operation of the information signal editing apparatus shown in FIG. 1;

FIG. 4 is a diagram (No. 3) for describing a further edit operation of the information signal editing apparatus shown in FIG. 1;

FIG. 5 is a diagram (No. 3) for describing a still further operation of the information signal editing apparatus shown in FIG. 1;

FIG. 8 is a diagram (No. 1) for describing a conventional edit operation;

FIG. 9 is a diagram (No. 2) for describing another conventional edit operation;

FIG. 10 is a diagram (No. 3) for describing a further conventional edit operation; and FIG. 11 is a diagram for describing a break in sound.

DETAILED DESCRIPTION OF THE PREFERRED EMBODIMENTS

Figure 3D:
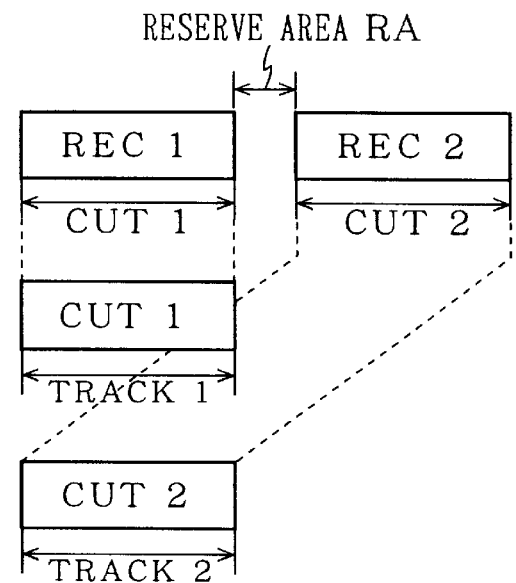
FIG. 3 is a diagram (No. 2) for describing another edit operation of the information signal editing apparatus shown in FIG. 1.

One embodiment of the present invention will hereinafter be described in detail with reference to the accompanying drawings.

FIG. 1 is a systematic diagram showing an apparatus 10 for editing an audio signal, particularly, a digital audio signal, to which the present invention can be applied.

An audio signal supplied to a terminal 12 is converted into a digital signal having a predetermined number of bits by an A/D converter 14. The input digital audio signal is first stored in a recording buffer means 16 and then recorded on a recording medium 18 at a predetermined transfer rate. As the buffer means 16, a buffer memory such as a RAM or the like can be used. As the recording medium 18, a random accessible medium is used. A magneto optical disk (MO) or the like short in access time is suitable for the recording medium.

Any of a digital converting process, a buffer process and a recording process and the like is controlled based on a command issued from a control means 20 having a microcomputer configuration equipped with a CPU. The control means 20 includes a ROM 22 having various control programs stored therein and a RAM 24 which serves as a working memory. Edit working is performed based on commands inputted via a keyboard 26.

When the recording position of data is shifted to another position on the recording medium 18 during recording, the writing of data into the recording medium 18 is interrupted during the time (corresponding to a few milliseconds to a several tens of milliseconds when a disk is used) required to access the position on the recording medium 18. However, since the input digital audio signal is already stored in the recording buffer means 16 even during the access time, the digital signal can be recorded on the recording medium 18 immediately after the completion of accessing. Accordingly, the recording medium 18 does not fail to record recording data thereon.

Since the rate of transfer of the data recorded on the recording medium 18 is faster than the transfer rate of the input digital audio signal (about several times to ten times), there is no fear of overflowing of the recording buffer means 16.

The data read from the recording medium 18 is temporarily stored in a reproducing buffer means (buffer memory) 28 and thereafter read out at the normal speed. A D/A converter 30 converts the read data into the original analog signal, which in turn is delivered to an output terminal 32. It is apparent that the read data may be also outputted as the digital signal as it is.

When the area for recording reproduced data therein is shifted to another position or area on the recording medium 18 during reproducing, the reading of the data from the recording medium 18 is interrupted during the time that elapsed before another recording area referred to above is accessed. However, since the data stored in the reproducing buffer means 28 continues to be outputted during that time, no reproduced sound is broken. The reading of the data from the recording medium 18 is resumed after the completion of the access to another recording area.

Since the rate of transfer of the data read from the recording medium 18 is faster than the rate of transfer of the output digital audio signal, there is little fear of the reproducing buffer means 28 being empty.

An area for storing therein information for controlling in which area any of digital audio signals is recorded, is prepared on the recording medium 18 in addition to the area in which the digital audio signal is recorded.

Prior to the recording and reproducing operations, the record control information is read in advance and stored in a record control information buffer. The RAM 24 can share the use of the buffer means. Based on the control information, the control means 20 performs control on the occurrence of read/write addresses at the recording buffer means 16 and the reproducing buffer means 28, the execution of reading and writing of data from and to the medium, etc.

Recording and reproducing operations (edit operations) of the editing apparatus 10 constructed in the above-described manner will now be described below.

Recording of audio signals into a non-recorded recording medium 18 over a ten seconds, for example, will first be shown in FIGS. 2A, 2B and 2C. Since the recording medium 18 is of a non-recorded medium at this time, a digital audio signal is recorded in a recording area corresponding to 10 seconds that elapsed as viewed from the head of the recording medium 18 (see FIG. 2A). To control this, the name (file name) referred to as "REC1" is given as record control information as shown in FIG. 2C. The position (corresponding to an address at which the signal is recorded for a time interval of from 0 to 10 seconds) in the recording medium is registered onto the file name as record control information.

Simultaneously with this, "CUT1" and "TRACK1" used as control information units for reproduction are registered as reproduction or reproducing control information. Since only one record is made on the recording medium in FIGS. 2A, 2B and 2C, all of "REC1", "CUT1", "TRACK1" indicate the same material substance.

The second recording will next be done. A state in which this recording has been managed or controlled as another "TRACK2", will be shown in FIGS. 3A, 3B, 3C and 3D. "TRACK2" created here at corresponds to "REC2". Therefore, since it is completely independent of "TRACK1" created previously, "REC2" is reproduced as one independent of "REC1" (see FIGS. 3B and 3C).

Thus, when the information independent of each other are recorded, recording positions on the recording medium are determined in accordance with the following procedures:

1. The last position (corresponding to the position at a tenth second in the present example) recorded on the recording medium is retrieved by reference to the "record control information".

2. An auxiliary area (corresponding to one second in the present example) having a predetermined length extending from the last recorded position detected in paragraph 1 referred to above is used as a reserve area and a position (at an eleventh second) spaced by the auxiliary area away from the last position is determined as the next information record starting position.

In the input digital audio signal recorded from the position determined in the above-described manner, its file name is called "REC2" as shown in FIG. 3D and its position (corresponding to a time interval of from 11th to 21st seconds) lying within the medium is registered as record control information.

Information included in the record control information will be recorded successively from the head of the medium. Accordingly, the information are recorded in the order of "REC1" and "REC2" in the present example. If done so, a recording position on the medium at the time that "REC3" is next created, can be determined by simply referring to the recording position at the end of the recorded information. As control information units for reproduction, "CUT2" and "TRACK2" are created as shown in FIG. 3C in the same manner as previous.

The manner in which an extension or splicing record (recording) is made behind "TRACK1", will next be shown in FIG. 4. The term splicing record indicates that a cut to be continuously reproduced on a given already-recorded cut upon reproducing is recorded as the same track. If the end of "TRACK1" prior to the splicing record, i.e., the end of "REC1" is a non-used recording area, then the splicing record may be performed within the non-used recording area as it is. However, when the position of the end thereof is occupied by "REC2" as shown in FIG. 4A, recording is executed based on the following procedures:

1. The last or final position (corresponding to the position at a 21st second in the example shown in FIG. 4) at which a digital audio signal has been recorded, is detected or retrieved with reference to the "record control information".

2. A position (at a 22nd second in the present example) displaced backward by an auxiliary area from the last recording position found out in paragraph 1 is determined as a new record starting position (see FIG. 4A).

3. At this time, only data (corresponding to the amount of information recordable within the auxiliary area) corresponding to the initial one second that elapses from after the record start, is superimposedly recorded even in an auxiliary area corresponding to one second, which has been reserved behind the end of "TRACK1" prior to the splicing record, i.e., the end of "REC1" in addition to the new recording location. The superimposed areas are indicated by oblique lines in FIGS. 4A and 4B.

4. When the superimposition record is done in this way, "REC1" is re-defined inclusive of the last auxiliary area RA. The new "REC1" is renewed in the form of "From 0 to 11 seconds" as shown in FIG. 4D.

Record control information corresponding to a newly-recorded portion is registered as "REC3" as shown in FIG. 4D. Since reproducing control information becomes a record (description) made according to the order at reproduction, it is changed to the definition that "REC3" added by the new splicing record is reproduced as "CUT3" and "TRACK1" is reproduced in the order of "CUT1" and "CUT3".

By changing the reproducing control information in this way, the initial recorded portion ("REC1") and splice-recorded portion ("REC3") of "TRACK1" are reproduced without breaks upon reproducing.

During the time between reading the last data of "CUT1" and reading the initial data of "CUT3", the reading of data is interrupted because of head access. However, no break in the reproduced sound occurs owing to the operation of the previously-described reproducing buffer means 28. The head or leading portion double-recorded behind "REC1" at the splicing record start is not contained in "CUT1" as shown in FIG. 4B and is hence not used as reproducing information.

The manner in which a portion of "TRACK1", which corresponds to, for example, 9.5 seconds as seen from the head of "TRACK1", is cut in accordance with an edit operation, will next be shown in FIGS. 5A, 5B, 5C and 5D. Edit working is performed by changing reproducing control information of control information alone without correcting a digital audio signal itself recorded in a medium.

Now consider where the portion of "TRACK1", which corresponds to 9.5 seconds as viewed from the head of "TRACK1" shown in FIG. 5A, is determined as unnecessary and cut. The leading position of "CUT1" in the reproducing information is displaced backward 9.5 seconds and its start point is changed to "9.5 seconds".

Let's now assume that a limit time length at which a break in sound occurs, is 1.0 second, for example in consideration of the access time (although the access time normally ranges from a few milliseconds to several tens of milliseconds, the access time will be regarded as 10 seconds with time allowance. Since the time length of the new "CUT1" becomes 0.5 second, the length thereof becomes shorter than a limit time length (=1 second) at which no break in sound is not produced upon reproducing.

In such a case, the end of "CUT1" is redefined so as to be "11 seconds" inclusive of the double-recorded portion. Thus, the time length of a new "CUT1'" is brought to 1.5 seconds and hence no break in sound is produced upon reproducing.

As a result of the above re-definition, the double-recorded portion RS exists even in "CUT3" at its head portion. Thus, the information is reproduced in doubled form if left as it is. To avoid this, the start position of "CUT3" is changed backward to a portion at which the double recording has been finished and its start point is redefined so as to be "23 seconds".

Even if extreme edit working is done by such an operation, all the time lengths of individual "CUT1" constituting "TRACK1" are brought to one second or longer. Thus, no break in sound is produced upon reproducing.

The time length (time width) of the above-described reserve area is defined as follows: Assuming now that a read speed of "CUT1'" newly defined by changing the start point is represented as Ts and the maximum access time is represented as Ta, the time width T of the reserve area is given as follows:

$$T \geq T/Ts + Ta \qquad (1)$$

The editing process accompanied by the re-defining process described above is performed in accordance with the edit programs stored in the ROM 22. Its specific processing flow will be explained with reference to FIGS. 6 and 7.

Figure 6:
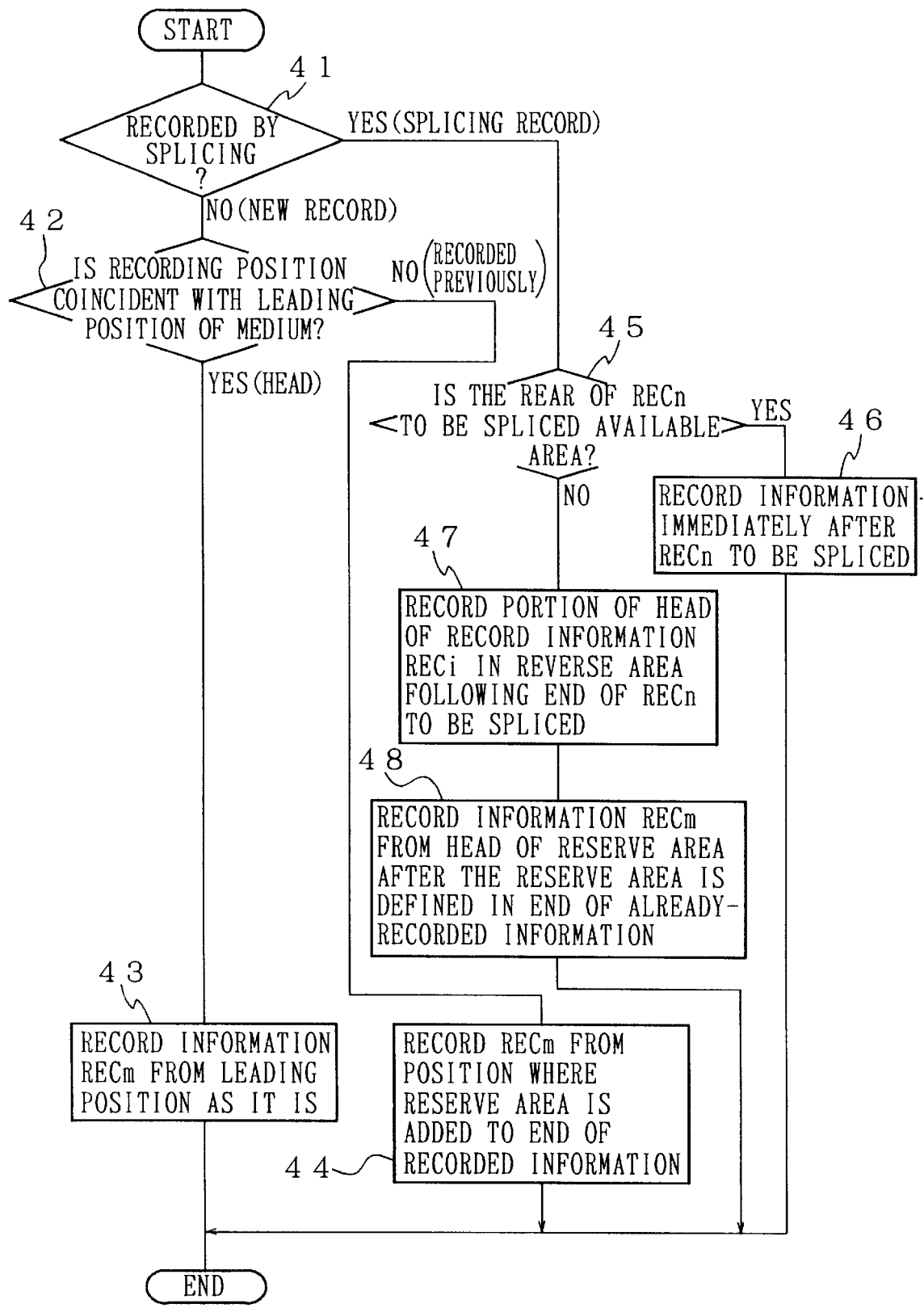
FIG. 6 is a flowchart for explaining one example of a recording mode.

FIG. 6 shows an example of processing in a recording mode. It is first judged or determined whether or not recording is an extension or splicing record (Step 41). If the answer is found to be NO in Step 41, it is then checked whether or not a record start position of an input digital audio signal is a leading position (initial address) of a recording medium (Step 42). Instructions as to whether or not recording is of the splicing record are given by a user via the keyboard 26. The decision made in Step 41 is performed based on the instructions given from the user.

Whether or not the record start position is of the leading position, may refer to the record control information. If the answer is found to be YES in Step 42, the digital audio signal is recorded from the leading position as it is (see FIG. 2) and is thereafter registered as record control information represented as "RECm" (Step 43).

On the other hand, if the answer is found to be NO in Step 42, it is then determined that the medium has been already used as for editing or the like. Therefore, the final recording position of the medium is retrieved and confirmed by reference to the record control information in this case. Further, the recording of the digital audio signal RECm is started from a position at which an auxiliary area is further added to the end of information recorded at the final recording position (Step 44). FIGS. 3A, 3B, 3C and 3D correspond to this example.

On the other hand, if the answer is found to be YES in Step 41, it is then determined whether a portion on the medium behind record information (cut) to be spliced is a non-used area (Step 45). If the answer is found to be YES in Step 45, then information to be recorded is recorded immediately after the record information to be spliced without providing the auxiliary area (Step 46). If it is determined that other information has been recorded behind the record information to be spliced, then the head or leading portion of information RECm to be recorded from now on is recorded in a reserve area used as the auxiliary area following the end of the record information RECn to be spliced (Step 47). When a change in such a cut as to become extremely short upon editing occurs, the cut is redefined as a new cut inclusive of the information recorded in the reserve area.

Thereafter, a reserve area is similarly created at the end of the final record information recorded on the medium. After its creation, the audio signal RECm recorded in the reserve area is recorded from its leading portion (Step 48).

Thus, the signal recorded in the reserve area is recorded in superimposed form. In order to achieve such a superimposition recording, the state of reading of the leading portion of the information is controlled so that the leading portion thereof is read in superimposed form from the recording buffer means 16.

Figure 7:
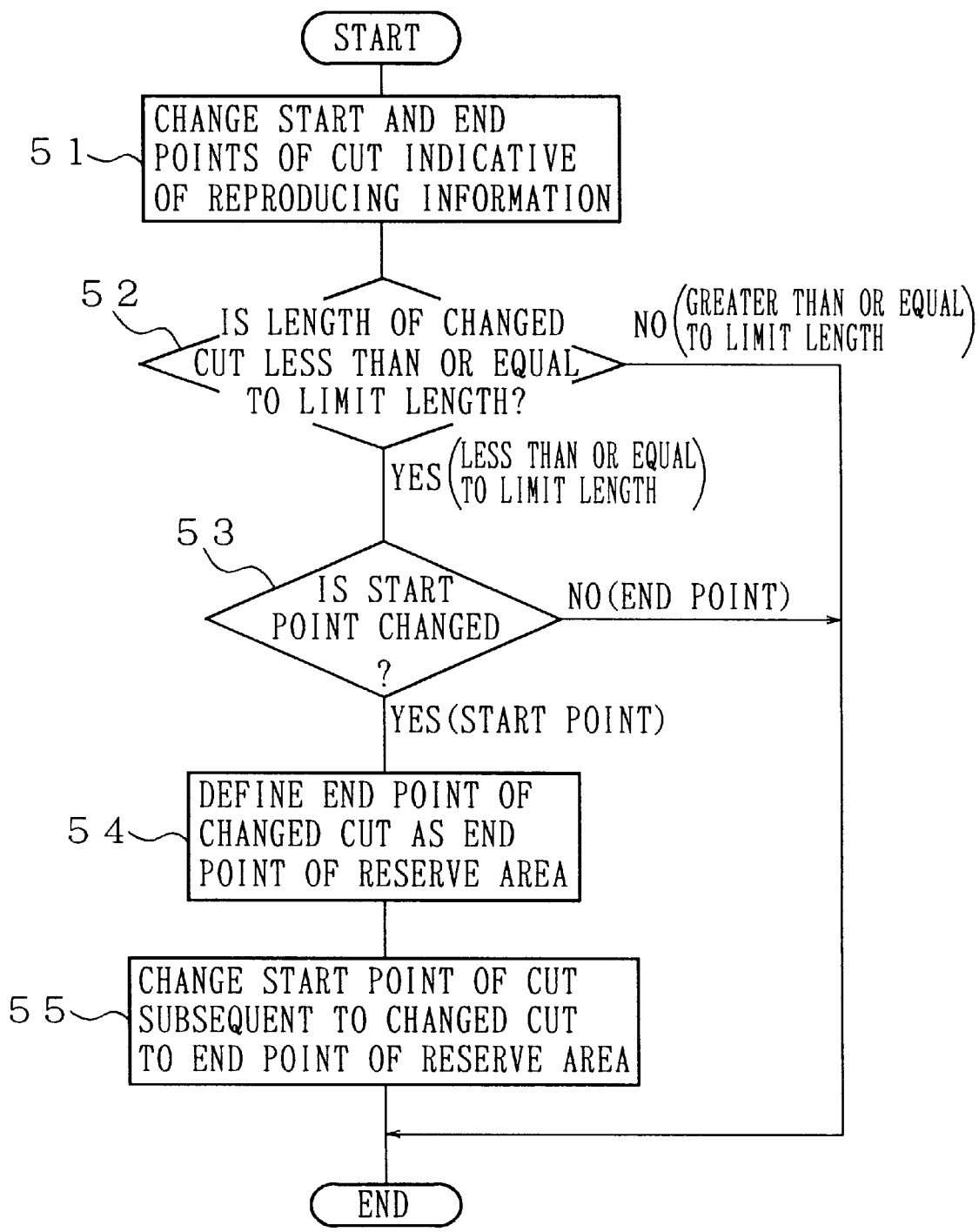
FIG. 7 is a flowchart for explaining one example of an editing mode.

The audio signals recorded in this way are outputted as the final continuous audio signal by an editing process shown in FIG. 7.

FIG. 7 is a flowchart for describing an example of processing in an edit mode. When an edit for changing a start point (or end point) of a cut corresponding to reproducing information is performed (Step 51), it is determined whether or not the length of a new cut (CUT1') obtained after its change is less than or equal to a limit length at which a break in sound occurs (Step 52). When the length of the cut is greater than or equal to the limit length even though the editing is performed, no break in sound is produced even if the access time is taken into consideration. Therefore, the normal reproducing process is performed in this case.

On the other hand, when such edit working that the length of the cut becomes extremely short, is performed and the length of the altered cut (CUT1') becomes less than or equal to the limit length, a decision is made as to whether or not its changed point is a start or end point of the cut (Step 53). If the answer is found to be YES in Step 53, the end point of the altered cut (CUT1') is replaced by an end point of a reserve area (Step 54). That is, the altered cut is newly redefined inclusive of the reserve area. Further, the start point of the new cut (CUT1') is defined as that of the altered cut and its end point is defined as that of the reserve area.

Thereafter, the start point of the remaining partly overlap-recorded cut (CUT3) on the same track is changed (Step 55). This is because the leading portion of the cut (CUT3) recorded in the reserve area has already been incorporated into the latter half of the new cut (CUT1').

The decision in Step 53 made as to whether the altered point of the cut is either the start point or the end point and the transition from Step 53 to Step 54 selected only upon change in the start point and later is based on the following reasons.

This is because such an edit that only the end point is changed with the start point remaining unchanged, is normally carried out. Since audio signals are recorded taking a splicing sequence into consideration in advance when an editor intends to carry out splicing records (splicing recordings), edit working for changing its end point is not so done. In the initial portion for splicing the audio signals on the other hand, the final adjustment to the spliced portion after its subtle change can realize smooth splice recordings in most cases. Therefore, the present invention is applied upon change in the start point alone in consideration of the material substance of such normal edit working.

In the present invention as described above, when the reserve area having the predetermined length is provided behind the initial record (CUT1) and is spliced with the CUT1 to thereby perform recording (CUT3), the same signal (data) as that at the leading portion of CUT3 is recorded in the reserve area. Although an excess time is required to record the same data at two points on the medium, the proper setting of the capacity of the recording buffer means 16 can compensate for the time referred to above.

In the present invention as has been described above, when the length of a cut redefined by edit working becomes less than or equal to a limit length, a recording/reproducing process and an editing process for providing a cut length greater than or equal to the limit length by redefining the cut whose length is less than or equal to the limit length if it remains as it is, inclusive of a reserve area are performed.

According to the present invention, even if the length of the redefined cut is less than or equal to the limit length, edit working can prevent the length of the cut from being less than or equal to the limit length. It is thus possible to reliably prevent the occurrence of breaks in reproduced sound.

Accordingly, the present invention is suitable for use in a professional audio editing apparatus or the like.

While the present invention has been described with reference to the illustrative embodiments, this description is not intended to be construed in a limiting sense. Various modifications of the illustrative embodiments will be apparent to those skilled in the art on reference to this description. It is therefore contemplated that the appended claims will cover any such modifications or embodiments as fall within the true scope of the invention.

What is claimed is:

1. A method of recording a plurality of Cuts of data on a random accessible recording medium, comprising the following steps:

a step of determining whether the Cut of data already recorded on said recording medium are spliced with input data to be recorded as a part of one track so that the input data is reproduced subsequently to the Cut of data already recorded on said recording medium;

a step of recording, upon recording the input data by splicing, a leading portion of the input data to be recorded subsequently to the end of a recording position of the Cut of data to be recorded be splicing, which has already been recorded on said recording medium, and wherein in said step of recording the input data on the non-recorded portion of said recording medium, the input data is recorded from a position spaced by a non-recorded auxiliary area having a predetermined length from the end of the last one of the Cuts of data already recorded on said recording medium, and wherein the predetermined length of said auxiliary area is equivalent to a time width of more than the sum of the time required to read data corresponding to said length upon reproducing of data from said recording medium and the time necessary for a head for reproducing said recording medium to access another position from a given position on said recording medium; and a step of recording the input data on a non-recorded portion of said recording medium from the start.

2. A method of recording a plurality of Cuts of data on a random accessible recording medium, comprising the following steps:

a step of determining whether the Cut of data already recorded on said recording medium are spliced with input data to be recorded as a part of one track so that the input data is reproduced subsequently to the Cut of data already recorded on said recording medium;

a step of recording, upon recording the input data by splicing, a leading portion of the input data to be recorded subsequently to the end of a recording position of the Cut of data to be recorded by splicing, which has already been recorded on said recording medium, and wherein in said step of recording the input data on the non-recorded portion of said recording medium, the input data is recorded from a position spaced by a non-recorded auxiliary area having a predetermined length from the end of the lastone of the Cuts of data already recorded on said recording medium, and wherein the time width T of said auxiliary area is given by the following expression:

$$T \geq Tl/Ts+Ta$$

where Ts represents read speed for the auxiliary area and Ta represents maximum access time of head for reproducing the Cut of data from said redording medium; and a step of recording the input data on a non-recorded portion of said recording medium from the start.

3. An editing apparatus comprising:

first buffer means for storing input data therein;

means for recording the input data read from said first buffer means on a recording medium at a speed faster than a speed for storing the input data in said first buffer means and reproducing data from said recording medium;

second buffer means for storing the data reproduced from said recording medium therein and outputting the stored reproduced data at a speed slower than the storing speed; and means for controlling said first and second buffer means and said recording and reproducing means, said control means controlling said first buffer means and said recording and reproducing means so that when the data already recorded on said recording medium is spliced with the data outputted from said first buffer means to be recorded as a part of one track to be reproduced subsequently to the data already recorded on said recording medium, a leading portion of the data outputted from said first buffer means to be recorded subsequently to the end of a recording position of the data to be recorded by splicing, which has already been recorded on said recording medium, is recorded and the data outputted from said first buffer means is recorded on a non-recorded portion of said recording medium from the beginning, and wherein the predetermined length of said non-recorded portion is equivalent to a time width of more than the sum of the time required to read data corresponding to said length upon reproducing of data from said recording medium and the time necessary for a head for reproducing said recording medium to access another position from a given position on said recording medium.

4. A method of recording a plurality of Cuts of data on a random accessible recording medium, comprising the following steps:

a step of providing auxiliary areas behind recording areas with the information signals already recorded and successively recording next-incoming information signals;

a step of accessing only a recording area specified by an editing list to read the information signals such as audio signals or the like upon reproducing;

a step of providing an auxiliary area behind the final record information recorded on a medium to define a spacing, and recording the information signal to be recorded by splicing; and a step of recording a recording a portion of the head of the information signal to be recorded by splicing so as to be superimposed on an auxiliary area following the already-recorded final recording area to be recorded by splicing, and wherein the predetermined length of said auxiliary area is equivalent to a time width of more than the sum of the time required to read data corresponding to said length upon reproducing of data from said recording medium and the time necessary for a head for reproducing said recording medium to access another position from a given position on said recording medium.

5. An apparatus for editing input information signals, including:

recording buffer means for temporarily storing the input information signals therein;

recording and reproducing means for recording the information signals read at a speed faster than their write speed on a recording medium;

reproducing buffer means for writing therein the information signals read from said recording medium and reading them therefrom at a speed slower than their write speed; and control means for controlling recording and reproduction, said control means controlling whether the information signals are to be recorded in an auxiliary area according to the presence or absence of recording by splicing, and monitoring whether a change of an edit point has occurred up to a length causing a break in sound due to editing, and wherein the predetermined length of said auxiliary area is equivalent to a time width of more than the sum of the time required to read data corresponding to said length upon reproducing of data from said recording medium and the time necessary for a head for reproducing said recording medium to access another position from a given position on said recording medium.

6. An editing apparatus according to claim 5, wherein said information signals are audio signals.

7. An apparatus for recording a plurality of data on a random accessible recording medium, the apparatus comprising:

means for recording a first data on said recording medium;

means for reserving an auxiliary area following a recording area of a previous recorded data, wherein said auxiliary area has a predetermined time length of more than the sum of a time necessary for accessing to read out a data recorded in said auxiliary area and a maximum time necessary for a head for accessing to one position from another position on the said recording medium;

means for receiving a source data to be connected to previous recorded data so that said previous recorded data and said source data will be reproduced from said recording medium sequentially;

means for recording a leading portion of said source data onto a said auxiliary area, and for recording said source data onto a free area different from said recording area of a previous recorded data and said auxiliary area.

* * * * *